(12) United States Patent
Xiao et al.

(10) Patent No.: US 11,549,908 B2
(45) Date of Patent: Jan. 10, 2023

(54) ELECTROCHEMICAL GAS SENSOR HOUSING HAVING A ONE-PIECE DESIGN

(71) Applicant: HONEYWELL INTERNATIONAL INC., Morris Plains, NJ (US)

(72) Inventors: Lei Xiao, Morris Plains, NJ (US); Feng Liang, Morris Plains, NJ (US); Jianming Jin, Morris Plains, NJ (US); Guoqiang Ni, Morris Plains, NJ (US); Qinghui Mu, Morris Plains, NJ (US); Sam Su, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 327 days.

(21) Appl. No.: 16/628,161

(22) PCT Filed: Jul. 3, 2017

(86) PCT No.: PCT/CN2017/091451
§ 371 (c)(1),
(2) Date: Jan. 2, 2020

(87) PCT Pub. No.: WO2019/006584
PCT Pub. Date: Jan. 10, 2019

(65) Prior Publication Data
US 2020/0124564 A1    Apr. 23, 2020

(51) Int. Cl.
*G01N 27/407*     (2006.01)
*G01N 27/406*     (2006.01)

(52) U.S. Cl.
CPC ..... *G01N 27/4078* (2013.01); *G01N 27/4062* (2013.01); *G01N 27/4071* (2013.01)

(58) Field of Classification Search
CPC ........... G01N 27/4078; G01N 27/4062; G01N 27/4071; G01N 27/4045
See application file for complete search history.

(56) References Cited

U.S. PATENT DOCUMENTS 6,454,923 B1 *  9/2002  Dodgson ............ G01N 27/4045
                                                204/401
7,022,213 B1 *  4/2006  Austen ................ G01N 27/404
                                                204/432
(Continued)

FOREIGN PATENT DOCUMENTS

CN        101251946 A     8/2008
CN        104458865 A     3/2015
(Continued)

OTHER PUBLICATIONS

International Search Report of the International Searching Authority for PCT/JP2018/017817 dated Mar. 30, 2018.
(Continued)

*Primary Examiner* — Joshua L Allen
(74) *Attorney, Agent, or Firm* — Alston & Bird LLC

(57) ABSTRACT

Apparatus and associated methods relate to a one-piece structure for a solid electrolyte chemical sensor (SECS) having a first surface defining a cavity (210, 305, 415) designed to receive a substrate (215, 350, 410) that retains a solid electrolyte (365, 440), an internal water impermeable coating (425) on at least a portion of the first surface, a second surface that is substantially coplanar with an adjacent peripheral edge of a top surface of the substrate (215, 350, 410) when the substrate (215, 350, 410) is received in the cavity (210, 305, 415), and a plurality of electrical contacts (335, 340, 345, 450a-450b) disposed on the second surface adapted to electrically couple with the electrodes (435a-435c) on the substrate (215, 350, 410) when the substrate (215, 350, 410) is received in the cavity (210, 305, 415) and electrical paths are provided between respective electrical contacts (335, 340, 345, 450a-450b) and electrodes (435a-435c).

9 Claims, 6 Drawing Sheets

(56) References Cited

U.S. PATENT DOCUMENTS

| | | | |
|---|---|---|---|
| 7,422,646 | B2 | 9/2008 | Prohaska et al. |
| 9,989,492 | B1* | 6/2018 | Cheng ................ G01N 27/4045 |
| 2003/0085125 | A1 | 5/2003 | Prohaska et al. |
| 2008/0289962 | A1 | 11/2008 | Prohaska et al. |
| 2010/0170795 | A1* | 7/2010 | Cowburn ............. G01N 27/404 |
| | | | 204/406 |
| 2014/0027313 | A1* | 1/2014 | Gau ..................... G01N 27/416 |
| | | | 29/829 |
| 2015/0075257 | A1 | 3/2015 | Paik et al. |
| 2016/0178565 | A1* | 6/2016 | Chapples ............. G01N 27/404 |
| | | | 204/412 |

FOREIGN PATENT DOCUMENTS

| | | |
|---|---|---|
| CN | 105606661 A | 5/2016 |
| EP | 1031031 A1 | 8/2000 |
| WO | 99/24826 A1 | 5/1999 |
| WO | 2017099963 A1 | 6/2017 |

OTHER PUBLICATIONS

Extended European Search Report issued in European Application No. 17917094.9 dated Jan. 21, 2021, 10 pages.
International Search Report and Written Opinion for PCT Application No. PCT/CN2017/091451, dated Mar. 30, 2018, 7 pages.
International Preliminary Reporton Patentability received for PCT Patent Application No. PCT/CN2017/091451, dated Jan. 16, 2020, 5 pages.

* cited by examiner

ELECTROCHEMICAL GAS SENSOR HOUSING HAVING A ONE-PIECE DESIGN

TECHNICAL FIELD

Various embodiments relate generally to electrochemical sensors.

BACKGROUND

Sensors are used to detect a wide variety of physical parameters. Such parameters may include pressure, temperature, and vibration, among other things. Sensors have assorted sizes and form factors, and are customized for different applications. For example, a current sensor is a device that detects electric current (AC or DC) in a wire, and generates a signal proportional to it. A magnetometer is sensor that measures magnetization of magnetic material (like a ferromagnet), or the direction, strength, or the relative change of a magnetic field at a particular location. Active-pixel sensors are image sensors consisting of an integrated circuit containing an array of pixel sensors, each pixel containing a photodetector and an active amplifier.

Electrochemical engineering is the branch of chemical engineering dealing with the technological applications of electrochemical phenomena. Electrochemical engineering combines the study of heterogeneous charge transfer at electrode/electrolyte interphases with the development of practical materials and processes. Electrochemical engineering considers current distribution, fluid flow, mass transfer, and the kinetics of the electro reactions in order to design efficient electrochemical reactors.

SUMMARY

Apparatus and associated methods relate to a one-piece structure for a solid electrolyte chemical sensor (SECS) having a first surface defining a cavity designed to receive a substrate that retains a solid electrolyte, an internal water impermeable coating on at least a portion of the first surface, a second surface that is substantially coplanar with an adjacent peripheral edge of a top surface of the substrate when the substrate is received in the cavity, and a plurality of electrical contacts disposed on the second surface adapted to electrically couple with the electrodes on the substrate when the substrate is received in the cavity and electrical paths are provided between respective electrical contacts and electrodes. In an illustrative example, the internal water impermeable coating may include a metallic material, such as gold. In various embodiments, the one-piece structure may advantageously prevent water loss from both the sensor substrate and the SECS.

In some examples, the cavity may have a floor and a shoulder, the shoulder designed to support the substrate. In some embodiments, the one-piece structure may possess several electrical contacts, which may couple to processing circuitry for detecting the presence of ambient carbon monoxide gas. In some examples, the substrate may include several electrical contacts that electrically couple to the SECS. Some examples may include a cover configured to mate with the one-piece structure.

Various embodiments may achieve one or more advantages. For example, some embodiments may minimize water loss from the SECS, which may prevent the SECS from being an unstable sensor due to high output impedance. Some examples may effectively eliminate water loss through a silicon rubber membrane surrounding the SECS by retaining humidity in the cavity of the one-piece structure. In some examples, the edges of the substrate may be in the same plane as the electrical contacts on the one-piece structure. This may allow for the wires connecting the electrical contacts of the substrate and one-piece structure to be confined to a common plane, which may provide for a more reliable electrical contact. In various embodiments, the overall cost of production of the sensor assembly may be substantially reduced by reduction of overall bill of materials costs and by reduction of overall assembly labor and/or machine time. In some examples, one-piece design may extend the functional life of the sensor by several years.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary use case scenario is briefly introduced with reference to FIG. 1. Second, with reference to FIGS. 2-4, the discussion turns to exemplary embodiments that illustrate various aspects of a solid electrolyte chemical sensor (SECS) assembly. Finally, with reference to FIG. 5, further explanatory discussion is presented to explain a system diagram for a processing circuit for detecting the presence of ambient carbon monoxide gas.

Figure 1:
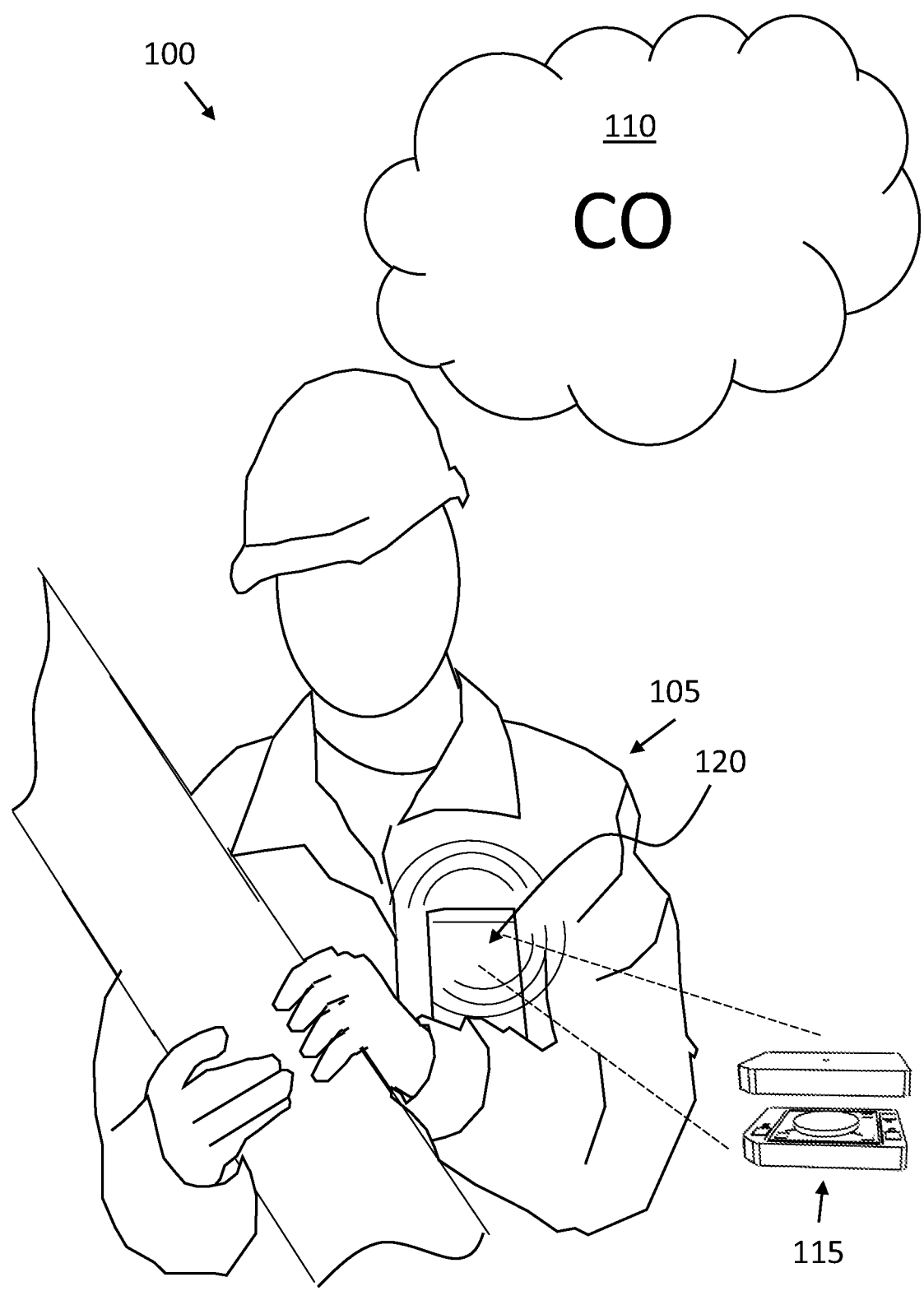
FIG. 1 depicts a perspective view of an exemplary use case scenario for a solid electrolyte chemical sensor (SECS) assembly.

FIG. 1 depicts a perspective view of an exemplary use case scenario for a SECS assembly. A use case scenario 100 shows a person 105 in the proximity of carbon monoxide gas 110. Because carbon monoxide is an odorless gas, the person 105 will not be able to detect that there is a toxic level of carbon monoxide gas 110 in his or her vicinity. The person 105 is wearing a solid electrolyte chemical sensor (SECS) assembly 115, which detects the presence of carbon monoxide gas 110. The SECS assembly 115 is attached at a point on the user's clothes 120.

Other use cases may be possible. For example, the SECS assembly may be located on a wall, a ceiling, or on a floor. The SECS assembly may be mobile, by being placed on a vehicle or a drone, for example.

Other types of gas detection may be possible. For example, the SECS assembly may be configured to detect other toxic gases, including carbon dioxide, nitrogen dioxide, and/or phosphine, for example.

Figure 2:
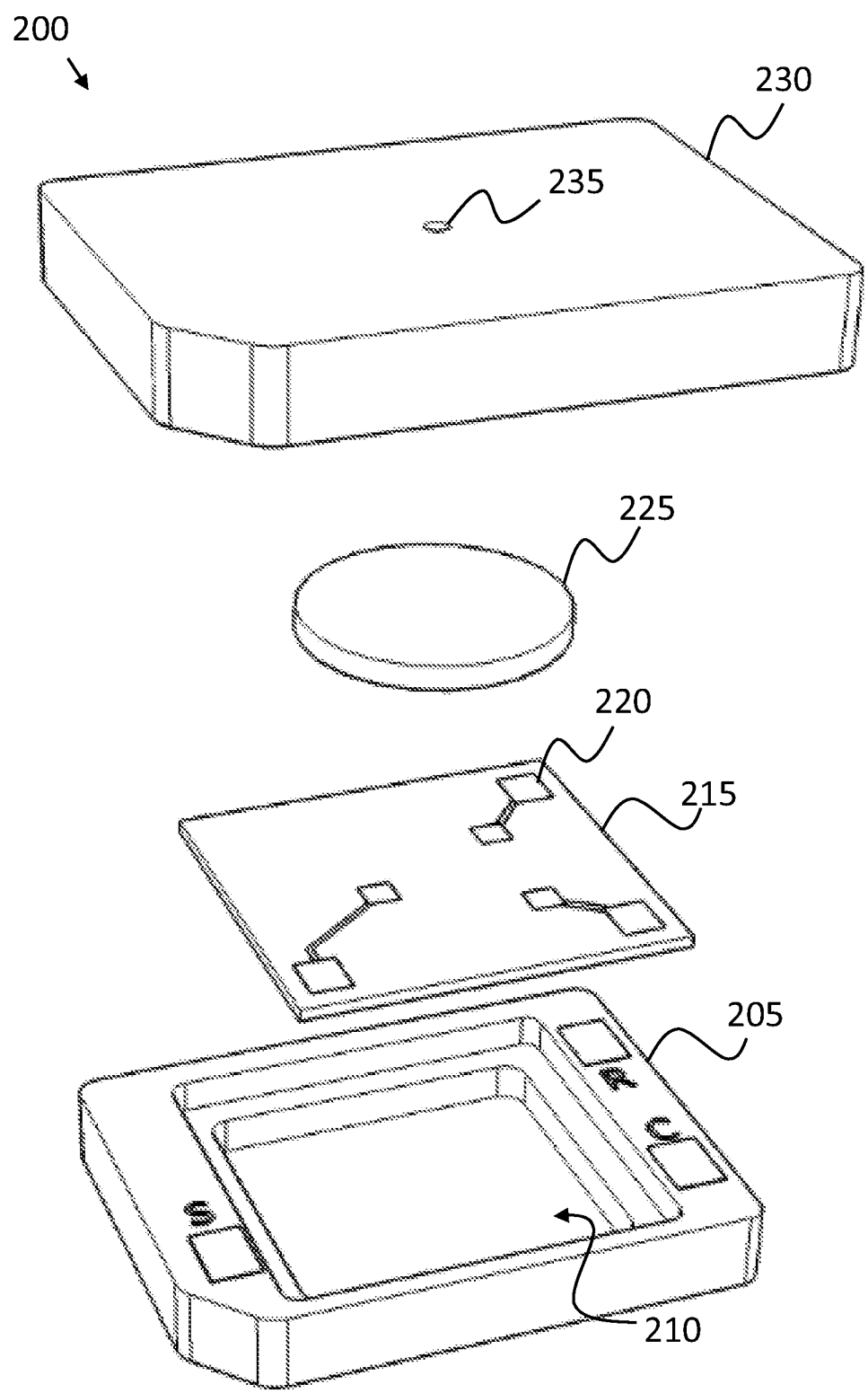
FIG. 2 depicts an exploded view of an exemplary a SECS assembly.

FIG. 2 depicts an exploded view of an exemplary a SECS assembly. A SECS assembly 200 includes a carrier body 205 at its lower end. The carrier body 205 is a one-piece structure that partially houses the components in the SECS assembly 200. The carrier body 205 has an inner cavity 210, which, in the illustrative embodiment, is formed by a floor, a shoulder, and at least two walls. The cavity 210 is sized to receive a substrate 215 In the illustrated embodiment, the substrate 215 is planar and rectangular in shape. The substrate 215 has a number of electrical contacts 220 formed on its surface. At least some of the electrical contacts 220 are coupled to a solid electrolyte (not shown) on the underside of the substrate 215.

Above the substrate 215 is a filter 225, which is disk-shaped in the illustrative embodiment. The filter 225 prevents the passage of unwanted gasses/substances (e.g., hydrogen sulfide) into the cavity 210. Above the filter 225 is a cover 230. The cover 230 is configured to mate with the carrier body 205. When mated, the carrier body 205 and cover 230 form an outer casing that encloses the inner components of the SECS assembly 200. The cover 230 includes an aperture 235 that permits at least some fluid communication between the ambient gas atmosphere and the inner compartments of the SECS assembly 200.

In various embodiments, the carrier body 205 and cover 230 may be formed at least partially out of a plastic material. In some examples, the carrier body 205 and cover 230 may have polygonal or curved profiles. In some embodiments, the substrate 215 may have a polygonal and/or curved profile, and may be non-planar in shape.

Figure 3A:
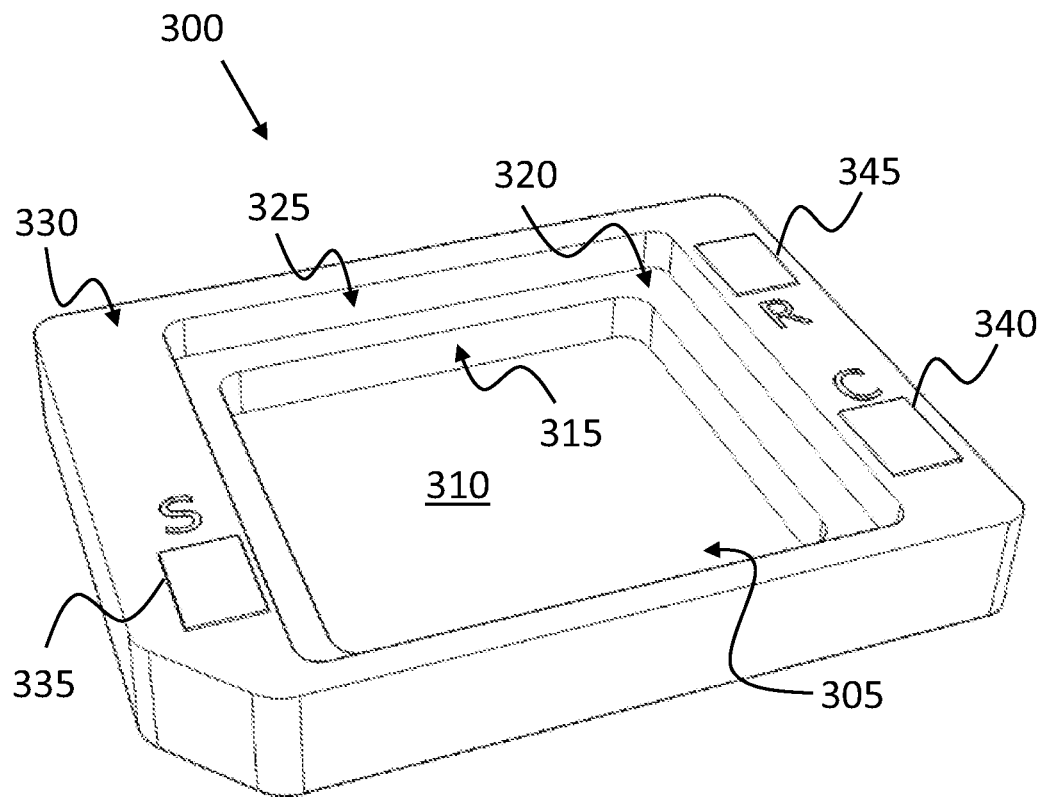
FIG. 3A depicts a perspective view of an exemplary one-piece carrier body for a SECS.

FIG. 3A depicts a perspective view of an exemplary one-piece carrier body for a SECS. Formed within a carrier body 300 is a cavity 305. In this illustrative example, the cavity 305 is defined by a floor 310, a first wall 315, a shoulder 320, and a second wall 325. Parts of the cavity 305 are coated with a water impermeable coating that prevents the outflux of water through the carrier body 300. The carrier body 300 further includes a top surface 330. Disposed on the top surface 330 are electrical contacts for working/sensing 335, counter 340, and reference 345.

In some examples, the cavity 210 may have a smooth, curved, and/or continuous surface (or surfaces). In various embodiments, the perimeter of the cavity 210 may be curved or jagged. In some embodiments, the floor 310, first wall 315, shoulder 320, and second wall 325 may all be coated with a water impermeable coating. In some examples, only the floor 310 and first wall 315 may have a water impermeable coating. In some embodiments, the water impermeable coating may be a metallic coating (e.g., gold).

Figure 3B:
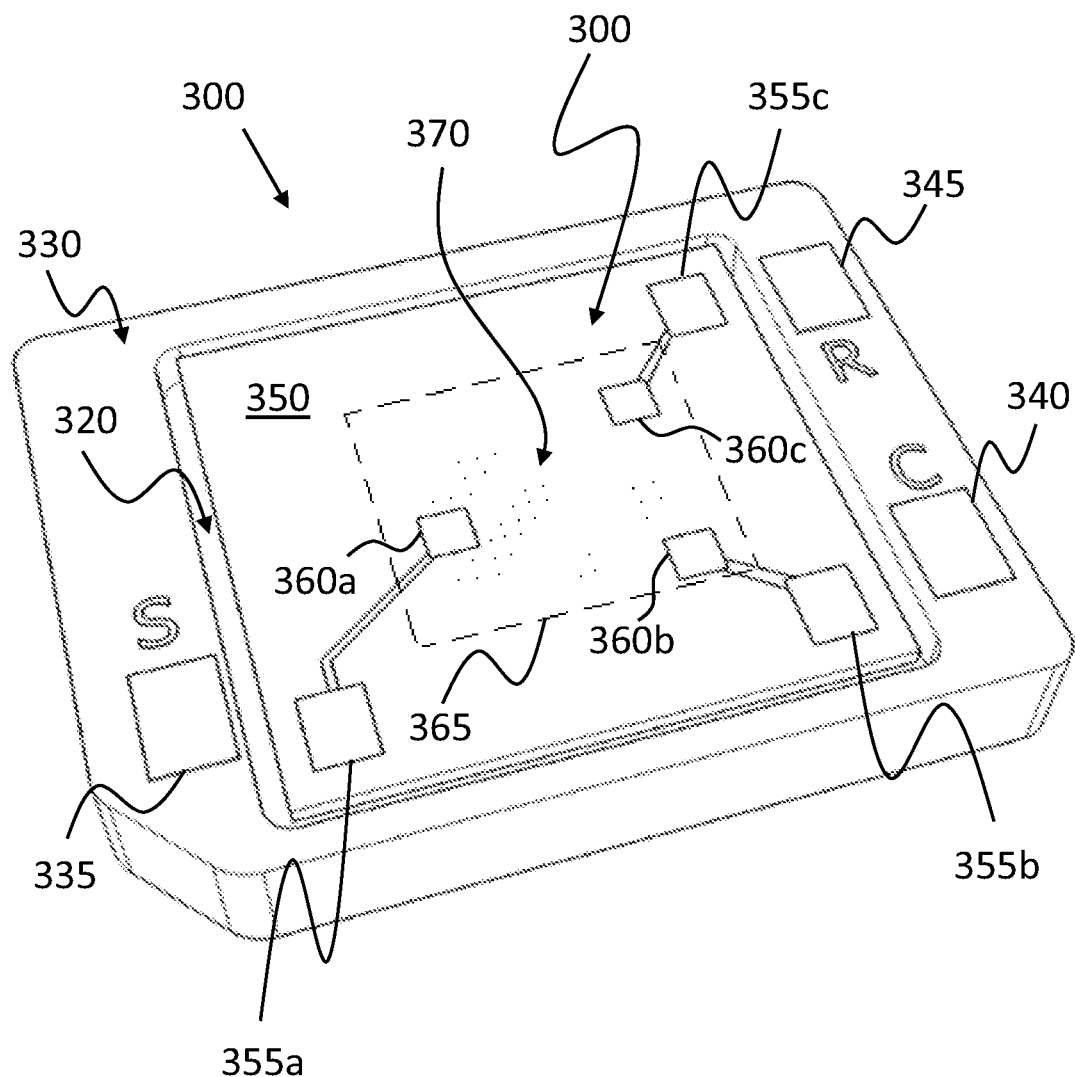
FIG. 3B depicts a perspective view of an exemplary one-piece carrier body for a SECS with a substrate placed in the carrier body.

FIG. 3B depicts a perspective view of an exemplary one-piece carrier body for a SECS with a substrate placed in the carrier body. A carrier body 300 holds a substrate 350. The substrate 350 is supported on the shoulder 320 of the carrier body 300. The edges of the upper surface of the substrate 350 is in substantially the same plane as (e.g., substantially coplanar with; substantially flush with) the top surface 330 of the carrier body 300. "Substantially in the same plane" in this context refers to a distance between the edges of the upper surface of the substrate 350 and the top surface 330 of the carrier body 300 of only about 0%, 5%, 10%, 15%, 20%, 25%, 30%, 35%, 40%, 45%, or 50% of the height of the substrate. The substrate 350 includes substrate electrical contacts 355a, 355b, and 355c, each corresponding to a respective one of the carrier body electrical contacts 335, 340, and 345 on the top surface 330. The substrate electrical contacts 355a-355c may connect to their respective carrier body electrical contacts 335, 340, and 345 via bond wires (not shown) that lie in the common plane defined by the upper surface of the substrate 350 and the top surface 330.

Each of the substrate electrical contacts 355a-355c is electrically connected to a respective electrode in a set of electrodes on the opposite surface of the substrate (not shown) via electrical contact points 360a, 360b, and 360c. At least some of the electrodes (not shown) are in electrical contact with a solid electrolyte 365 located on the underside of the substrate 350. When a chemically reactive gas (e.g., carbon monoxide) diffuses into the sensor on the sensing/working electrode (which is electrically connected to electrical contact point 360a), the gas is either oxidized or reduced. At the counter electrode (which is electrically connected to electrical contact point 360b), an equal and opposite reaction occurs, such that if the working electrode is in oxidation, then the counter electrode is in reduction (and vice-versa). This results in a potential difference between the sensing/working electrode and the counting electrode, causing current to flow between the two electrodes via the electrolyte 365. The current flows through the electrical contact points 360a and 360b and substrate electrical contacts 355a and 355b to/from the carrier body electrical contacts 335 and 340. The current at the carrier body electrical contacts 335 and 340 is then detected at an external circuit (not shown), which performs measuring, amplifying, and other signal processing functions. In addition, the external circuit maintains the voltage across the working/sensing electrode and reference electrode (for a three-electrode configuration). Gas capillaries 370 permit fluid (e.g., gaseous) communication between the ambient atmosphere and at least some of the electrodes, which allow for oxidation/reduction reactions to occur at the electrodes In some examples, there may be two electrodes on the substrate 350. In some embodiments, the number of electrodes on the substrate 350 may be greater than or equal to three. In various examples, the electrodes may be at least partially made out of a metallic substance (e.g., platinum, gold, silver, and/or copper). In some embodiments, the electrodes may be at least partially made out of a non-metallic substance (e.g., carbon, graphite).

Figure 4:
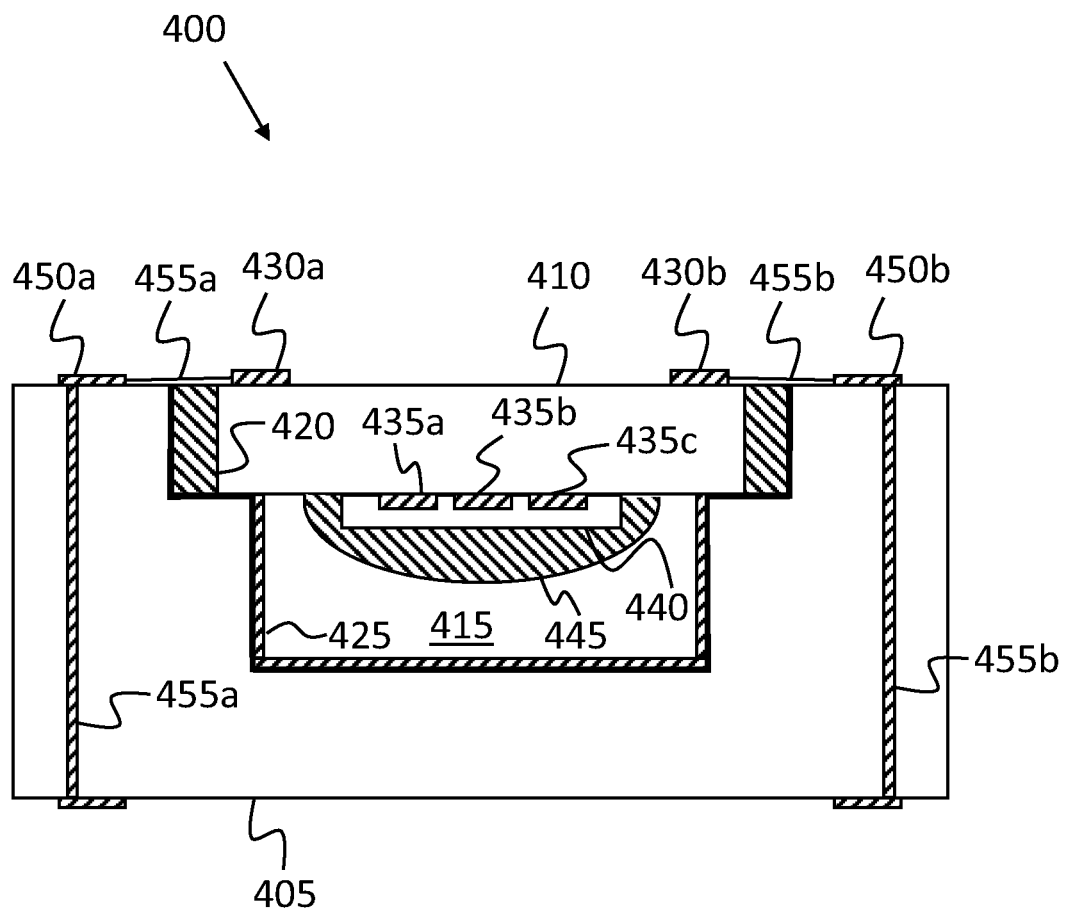
FIG. 4 depicts a side view of an exemplary SECS assembly.

FIG. 4 depicts a side view of an exemplary SECS assembly. A SECS assembly 400 includes a carrier body 405 and a substrate 410. The substrate 410 sits on a shoulder of a cavity 415 of the carrier body 405. The upper wall of the cavity 415 sealingly engages the perimeter of the substrate 410 via sealing material 420. In the illustrated embodiment, the floor and lower wall of the cavity 415 are covered in a water impermeable coating 425. The water impermeable coating 425 aids in retaining the humidity in the cavity 415.

In some embodiments, the one-piece nature of the carrier body 405 may advantageously minimize water loss from the cavity 415. In some examples, the sealing material 420 may be comprised of a material suitable for sealing the upper wall of the cavity 415 to the perimeter of the substrate 410. This sealing may be accomplished, for example, by soldering, ultrasonic welding, reflow soldering, an adhesive material, and/or a water impermeable barrier. In some embodiments, the surface of the cavity 415 may be curved, continuous, and/or bowl-shaped. In various examples, the water impermeable coating 425 may cover only parts of the surface of the cavity 415. In various embodiments, the water impermeable coating 425 may cover the entire surface area of the cavity 415 (including the cavity's 415 shoulder and the upper wall). In some examples, the substrate 410 may lie above the shoulder of the cavity 415.

The substrate 410 has substrate electrical contacts 430a-430b on its top surface. A third substrate electrical contact (not shown) is also located on the top surface of the substrate 410. The substrate electrical contacts 430a-430b (including a third substrate electrical contact (not shown)) are electrically coupled (through electrical connections in the substrate 410 (not shown)) to a respective electrode in a set of electrodes 435a-435c. The electrodes 435a-435c are working/sensing, counter, and reference electrodes in this illustrative embodiment. The electrodes 435a-435c are in electrical communication with a solid electrolyte 440. Surrounding the solid electrolyte 440 is a silicon rubber layer 445, which creates a seal to prevent the solid electrolyte 440 from detaching from the substrate 410.

In some embodiments, the number of electrodes 435 may be greater than or equal to two. In various examples, the electrodes 435a-435c comprise only a working/sensing electrode and a counter electrode. In some examples, only some of the electrodes 435a-435c may be in electrical communication with the solid electrolyte 440. In various examples, the silicon rubber layer 445 may be formed out of a different material (e.g., a matrix polymer).

The carrier body 405 further includes carrier body electrical contacts 450a-450b (including a third carrier body electrical contact (not shown)). The carrier body electrical contacts 450a-450b are electrically connected to a corresponding substrate electrical contact 430a-430b by bond wires 455a-455b. A third carrier body electrical contact (not shown) is electrically connected to a corresponding third substrate electrical contact (not shown) by a third bond wire (not shown). The bond wires 455a-455b allow for current to flow to/from the electrodes 435a-435c to respective carrier body electrical contacts 450a-450b. The carrier body electrical contacts 450a-450b are connected to electrical channels 455a-455b that run through the carrier body 405. The electrical channels 455a-455b are designed to interface with an external circuit (not shown). Accordingly, a potential difference between the electrodes 435a-435c caused by the presence of a chemically reactive gas results in an electrical current that can be detected at the external circuit (not shown) due to the electrical couplings between the electrodes, substrate electrical contacts, carrier body electrical contacts, and electrical channels.

In some examples, the electrical channels may be optional. In some embodiments, the bond wires 455a-455b may lie in a plane shared with the top surface of the carrier body 405 and the outer perimeter of the substrate 410. This may advantageously result in a more resilient design with less likelihood for breakage of the bond wires 455a-455b. In various embodiments, the substrate electrical contacts 430a-430b may directly couple to the external circuit.

Figure 5:
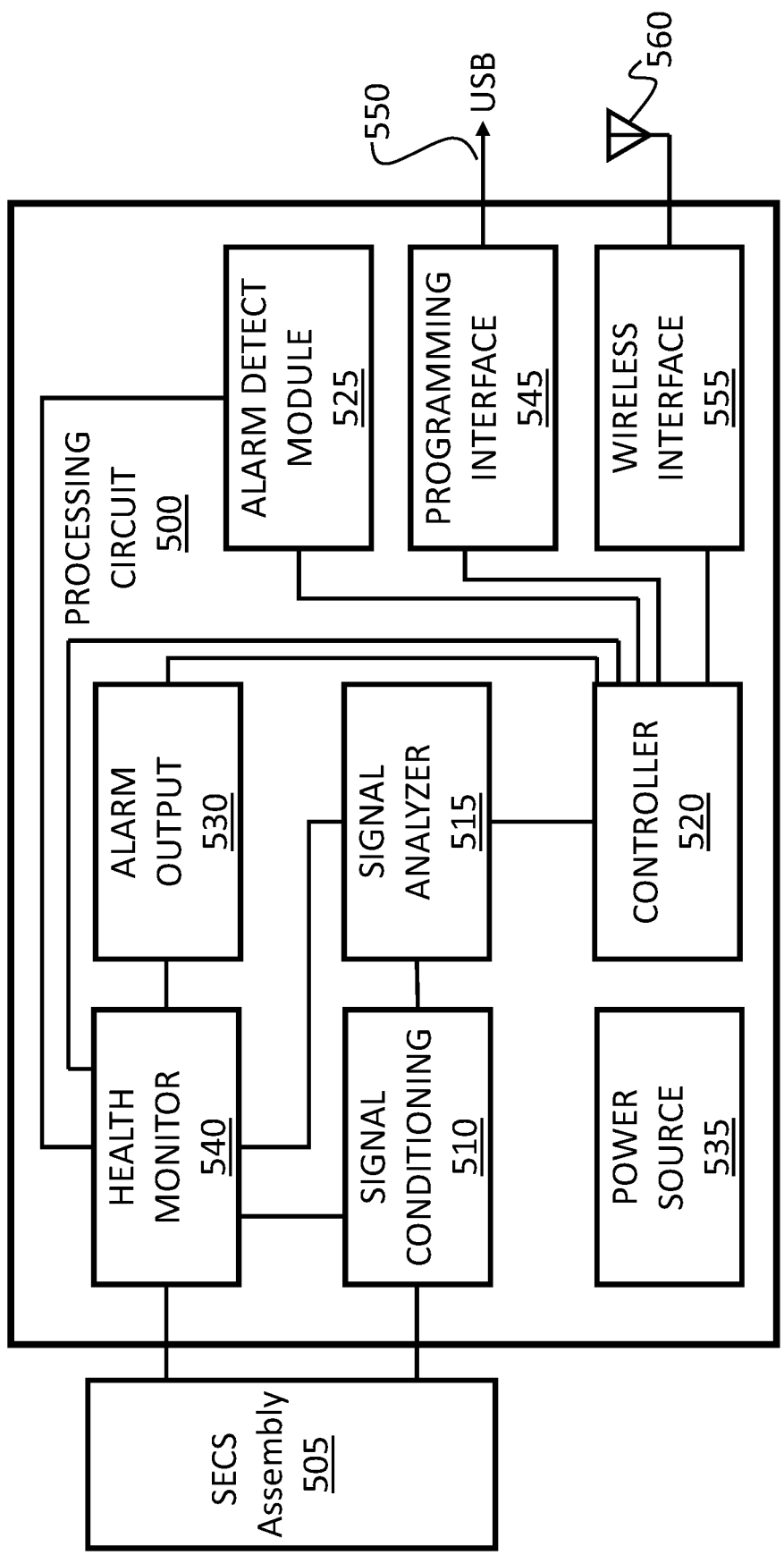
FIG. 5 depicts a system diagram of an exemplary processing circuit coupled to an SECS assembly.

FIG. 5 depicts a system diagram of an exemplary processing circuit coupled to an SECS assembly. A processing circuit 500 is operably coupled to a SECS assembly 505. Potential difference between the electrodes in the SECS assembly caused by the presence of a chemically reactive gas results in an electrical signal, which can be detected at the processing circuit 500. The electrical signal from the SECS assembly is received at a signal conditioning element 510. The signal conditioning element 510 manipulates the signal from the SECS assembly to prepare the signal for analysis at a signal analyzer 515.

In some embodiments, the signal conditioning element 510 may include an analog to digital converter. In some examples, the signal conditioning element 510 may perform, for example, amplification, filtering, converting, range matching, isolation, and/or any other processes to make the sensor output suitable for processing after conditioning.

In various embodiments, the signal analyzer 515 may perform various analysis functions of the incoming electrical signal to discover information about some aspect of the signal. For example, since the output from the sensor in the SECS assembly may be linearly proportional to the gas concentration, the output of the signal may be linearly processed to detect the exact concentration of the ambient gas around the SECS assembly. In some examples, the signal analyzer 515 may perform a variety of signal processing functions, including, for example, stochastic filtering, sampling, digital signal processing, statistical operations, spectral analysis, time-frequency/series analysis, thresholding, digital to analog conversion, and/or data transformation.

Coupled to the signal analyzer 515 is a controller 520, which controls various elements and operations within the processing circuit 500. The output from the signal analyzer 515 is received as input at the controller 520. The controller 520 may perform various functions and operations in response to the input received from the signal analyzer 515.

For example, the controller may forward the signal from the signal analyzer to an alarm detect module 525. If the alarm detect module 525 determines that the received signal is above a predetermined threshold, the alarm detect module 525 may send a signal to the controller 520 indicating that an alarm should be activated. The controller 520 may then send a signal to an alarm output 530 instructing the alarm output 530 to activate an alarm.

In some examples, the alarm output 530 may take different forms, including, but not limited to, audible, optical, and/or vibration. In some examples, the alarm output 530 may receive signals from the controller 520. In various embodiments, the alarm output 530 may receive signals from the alarm detect module 525.

Various elements of the processing circuit 500 are powered by a power source 535. The power source 535 may, for example, be a battery, a generator, or an electrical socket. The power source 535 may be connected to any of the elements in the processing circuit to provide power to those elements.

In this illustrative embodiment, the processing circuit 500 further includes a health monitor 540, which monitors the health of various elements in the processing circuit 500. For example, the health monitor 540 may receive a heartbeat signal from the signal conditioning element 510 to ensure that it is functioning properly. The health monitor 540 may receive a heartbeat signal from the alarm output 530 to ensure that the alarm is functioning properly.

The processing circuit 500 further includes a programming interface 545 coupled to the controller 520. The programming interface 545 allows for external programming of the various features of the processing circuit 500. The programming interface 545 in this embodiment includes a USB interface 550 for connecting to other USB enabled devices. Also connected to the controller 520 is a wireless interface 555. The wireless interface 555 may be configured to receive and/or transmit signals through an antenna 560. In one exemplary embodiment, the programming and/or wireless interfaces 545, 555 may be able to send command signals to the controller 520, transmit signals from the controller 520, and/or reprogram the controller 520.

Although various embodiments have been described with reference to the figures, other embodiments are possible. For example, preventing water transfer on the sensor substrate may be solved by a one-piece structure (e.g., carrier body)

having a wall defining a cavity, and an internal water impermeable coating, the cavity adapted for receiving a substrate that retains a solid electrolyte chemical sensor. In some examples, the one-piece design may advantageously mitigate low humidity and/or high temperature environments.

In an illustrative embodiment, unreliable and/or time-consuming wire connection between the substrate and the housing may be solved by connection points on the housing being in the same plane as the substrate, so that the wire bounding is isolated to that common plane. In some embodiments, the wire may be a planar wire.

In various embodiments, the carrier body may be a printed circuit board (PCB). In some examples, the PCB may be a multi-layer construction. In some examples, the PCB may be double sided. In some examples, the PCB may be single layer.

In some examples, the sensor may be a solid polymer electrolyte (SPE) sensor. In some examples, the sensor may be an oxygen sensor. In some embodiments, these types of sensors may be low leakage and long life.

In various embodiments, the assembly may include a SIM card casing for a SECS with metal coating for environmental robustness. In some examples, the SECS assembly may provide for an efficient method to protect water transfer on the sensor substrate in the presence of a strong acid.

In various examples, a design may utilize a PCB wall, which may establish an electrical connection through the body of the mechanical structure. Such a construction may provide for a more reliable connection (e.g., inside the wall, which has little chance to break even in extreme conditions). In some examples, the substrate may be on the same plane as the connector, so wire bounding may only be in an x-y dimension. In some examples, a one-piece design may minimize water loss. In some examples, an internal metal coating may completely eliminate water loss from water passing through the silicon rubber. This may reduce the overall sensor water loss by over 80%, advantageously making the sensor more robust in extreme condition. In some examples, the one-piece design reduces the cost of manufacturing, as less parts may be needed. In some examples, the production cycle time may be lower, resulting in over $1 per sensor saving which may be beneficial to lower end customers.

In some examples, the SECS assembly may be implemented on a safety card. In various embodiments, the sensor may not require a bump or calibration for a year or more, which advantageously provides for environmental robustness. In some embodiments, the compact and efficient design may be low cost, allowing the product to meet a wider target market. In various embodiments, the one-piece design may allow the sensor to work over longer period of time under extreme conditions with extra cavity volume factored in for expansion (e.g., at extreme low and high humidity conditions). In various examples, wire bonding may reduce production time. The one-piece design may provide higher reliability. In some embodiments, the SECS assembly may reduce the risk of connection failure that may otherwise subject a user to dangerous conditions.

In some examples, an electrochemical gas sensor assembly may include a one-piece carrier body including a first surface defining a cavity, the cavity being adapted for receiving a substrate that retains a plurality of electrodes and a solid electrolyte. The one-piece carrier body may further include a water impermeable coating on at least a portion of the first surface for preventing water transfer through the cavity. The one-piece carrier body may further include a second surface that is substantially coplanar with an adjacent peripheral edge of a top surface of the substrate when the substrate is received in the cavity. The one-piece carrier body may further include a plurality of electrical contacts disposed on the second surface, each one of the plurality of electrical contacts being adapted to electrically couple with a corresponding one of the plurality of electrodes on the substrate when the substrate is received in the cavity and electrical paths are provided between each one of the plurality of electrical contacts and the corresponding one of the plurality of electrodes.

In some examples, the first surface and second surface may meet at an inner perimeter of the second surface, such that the first surface extends downward to form a reservoir. In various embodiments, the first surface may include a floor and a shoulder, the shoulder being adapted to support the substrate. In some embodiments, the water impermeable coating may include a metallic material. In some examples, the number of electrical contacts may be exactly three. In various embodiments, the electrochemical gas sensor assembly may include a cover configured to mate with the carrier body, the cover having an aperture that permits the influx of ambient gasses into the cavity. In various examples, the electrical contacts may be adapted to couple to a processing circuit for detecting the presence of ambient carbon monoxide gas, such that a chemical response to ambient gas can be measured electrically.

In various embodiments, an electrochemical gas sensor assembly may include a substrate adapted to retain a solid electrolyte, the substrate including a plurality of electrodes adapted to electrically couple to the solid electrolyte. The substrate may further include a plurality of gas capillaries that permit fluid communication between an ambient atmosphere and at least one of the electrodes in the plurality of electrodes. In some examples, the electrochemical gas sensor assembly may further include a one-piece carrier body including a first surface defining a cavity, the cavity adapted for receiving the substrate. The one-piece carrier body may further include a water impermeable coating on at least a portion of the first surface for preventing water transfer through the cavity. The one-piece carrier body may further include a second surface that is substantially coplanar with an adjacent peripheral edge of a top surface of the substrate when the substrate is received in the cavity. The one-piece carrier body may further include a plurality of electrical contacts disposed on the second surface, each one of the plurality of electrical contacts being adapted to electrically couple with a corresponding one of the plurality of electrodes on the substrate when the substrate is received in the cavity and electrical paths are provided between each one of the plurality of electrical contacts and the corresponding one of the plurality of electrodes.

In various embodiments, the substrate may further include a plurality of electrical pads adapted to connect to electrically couple each of the electrodes in the plurality of electrodes to the corresponding one of the plurality of electrical contacts. In some examples, at least a portion of the first surface may sealingly engage the peripheral edge of the substrate to form a perimeter seal, such that the cavity is water retaining.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:
1. An electrochemical gas sensor assembly comprising:
a substrate having a top surface and a bottom surface, the substrate adapted to retain a solid electrolyte, the substrate comprising:
a plurality of electrodes disposed on the bottom surface of the substrate, the substrate adapted to electrically couple to the solid electrolyte;
a silicon rubber layer disposed on the solid electrolyte; and
a plurality of gas capillaries that permit fluid communication between an ambient atmosphere and at least one of the electrodes in the plurality of electrodes; and,
a one-piece carrier body comprising:
a first surface defining a cavity, the cavity adapted for receiving the substrate;
a water impermeable coating on at least a portion of the first surface for preventing water transfer through the cavity;
a second surface that is substantially coplanar with an adjacent peripheral edge of the top surface of the substrate when the substrate is received in the cavity; and,
a plurality of electrical contacts disposed on the second surface, each one of the plurality of electrical contacts adapted to electrically couple with a corresponding one of the plurality of electrodes disposed on the bottom surface of the substrate when the substrate is received in the cavity and electrical paths are provided between each one of the plurality of electrical contacts and the corresponding one of the plurality of electrodes.

2. The assembly of claim 1, wherein the substrate further comprises a plurality of electrical pads adapted to connect to electrically couple each of the electrodes in the plurality of electrodes to the corresponding one of the plurality of electrical contacts.

3. The assembly of claim 1, wherein at least a portion of the first surface sealingly engages the adjacent peripheral edge of the top surface of the substrate to form a perimeter seal, such that the cavity is water retaining.

4. The assembly of claim 1, wherein the first surface and the second surface meet at an inner perimeter of the second surface, wherein the first surface extends downward to form a reservoir.

5. The assembly of claim 1, wherein the first surface comprises a floor and a shoulder, the shoulder adapted to support the substrate.

6. The assembly of claim 1, wherein the water impermeable coating comprises a metallic material.

7. The assembly of claim 1, wherein the plurality of electrical contacts consists of three electrical contacts.

8. The assembly of claim 1, further comprising a cover configured to mate with the carrier body, the cover having an aperture that permits the influx of ambient gasses into the cavity.

9. The assembly of claim 1, wherein the plurality of electrical contacts are adapted to couple to a processing circuit for detecting the presence of ambient carbon monoxide gas, such that a chemical response to ambient gas can be measured electrically.

\* \* \* \* \*